United States Patent
Mochizuki

(10) Patent No.: US 10,068,164 B2
(45) Date of Patent: Sep. 4, 2018

(54) PRINT CONTROL DEVICE, METHOD FOR PRINT CONTROL AND NON-TRANSITORY COMPUTER READABLE MEDIUM STORING PROGRAM FOR PRINT CONTROL

(71) Applicant: FUJI XEROX CO., LTD., Tokyo (JP)

(72) Inventor: Mamoru Mochizuki, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/218,340

(22) Filed: Jul. 25, 2016

(65) Prior Publication Data

US 2017/0277985 A1     Sep. 28, 2017

(30) Foreign Application Priority Data

Mar. 24, 2016 (JP) .................................. 2016-060358

(51) Int. Cl.
  *G06K 15/00* (2006.01)
  *G06K 15/02* (2006.01)
  *G06F 3/12* (2006.01)

(52) U.S. Cl.
  CPC .......... *G06K 15/409* (2013.01); *G06F 3/1211* (2013.01); *G06F 3/1229* (2013.01); *G06F 3/1273* (2013.01); *G06F 3/1282* (2013.01); *G06K 15/1807* (2013.01); *G06K 15/1836* (2013.01); *G06K 15/1849* (2013.01)

(58) Field of Classification Search
  None
  See application file for complete search history.

(56) References Cited

U.S. PATENT DOCUMENTS

| | | | | |
|---|---|---|---|---|
| 7,382,474 | B2* | 6/2008 | Motosugi | G06F 3/1212 |
| | | | | 358/1.14 |
| 8,595,727 | B2* | 11/2013 | Nakahara | G06F 21/608 |
| | | | | 715/700 |
| 9,626,136 | B2* | 4/2017 | Tsuchiya | G06F 3/1238 |
| 2008/0074683 | A1 | 3/2008 | Yanamura et al. | |
| 2009/0180141 | A1 | 7/2009 | Takaishi et al. | |
| 2010/0131704 | A1 | 5/2010 | Mannen et al. | |
| 2011/0191614 | A1* | 8/2011 | Tsuzuki | G06F 1/32 |
| | | | | 713/320 |

(Continued)

FOREIGN PATENT DOCUMENTS

| | | |
|---|---|---|
| JP | H08-263349 A | 10/1996 |
| JP | H09-244933 A | 9/1997 |
| JP | 2010-128808 A | 6/2010 |

OTHER PUBLICATIONS

Jan. 5, 2018 Office Action issued in European Patent Application No. 16187441.7.

*Primary Examiner* — Dung D Tran
(74) *Attorney, Agent, or Firm* — Oliff PLC

(57) ABSTRACT

A print control device is provided with a management unit that receives and manages an instruction to execute processing, a processing unit that performs processing based on the instruction that is received, and a storage unit that stores an attribute information indicating an attribution of the instruction stored by the management unit and state information indicating a processing state of the processing unit in a nonvolatile storing unit using resources of the processing unit when processing based on the instruction is not executed.

8 Claims, 9 Drawing Sheets

(56) References Cited

U.S. PATENT DOCUMENTS

| | | | |
|---|---|---|---|
| 2012/0243047 A1* | 9/2012 | Hayakawa | G06K 15/1849 358/1.16 |
| 2013/0050759 A1* | 2/2013 | Tsuchiya | G06F 3/1238 358/1.15 |
| 2013/0208297 A1* | 8/2013 | Kawanishi | G06K 15/1817 358/1.14 |
| 2014/0160517 A1* | 6/2014 | Masuyama | G06F 3/1221 358/1.14 |
| 2014/0192378 A1* | 7/2014 | Misawa | G06F 3/1211 358/1.15 |
| 2014/0268201 A1* | 9/2014 | Mochizuki | G06F 3/1298 358/1.13 |

* cited by examiner

US 10,068,164 B2

PRINT CONTROL DEVICE, METHOD FOR PRINT CONTROL AND NON-TRANSITORY COMPUTER READABLE MEDIUM STORING PROGRAM FOR PRINT CONTROL

CROSS-REFERENCE TO RELATED APPLICATIONS

This application is based on and claims priority under 35 USC 119 from Japanese Patent Application No. 2016-060358 filed on Mar. 24, 2016.

BACKGROUND

Technical Field

The present invention relates to a print control device and a program.

SUMMARY

An aspect of the invention provides a print control device including a management unit that receives and manages an instruction to execute processing, a processing unit that performs processing based on the instruction that is received, and a storage unit that stores an attribute information indicating an attribution of the instruction stored by the management unit and state information indicating a processing state of the processing unit in a nonvolatile storing unit using resources of the processing unit when processing based on the instruction is not executed.

According to the aspect of the present invention, it is possible to provide a print control device capable of allowing a system to restore to the original state even when an unexpected power interruption occurs while reducing an adverse effect on the printing performance as compared to a case in which various items of information generated when print control is executed based on a print instruction are automatically stored in a nonvolatile memory.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the present invention will be described in detail with reference to the drawings.

Figure 1:
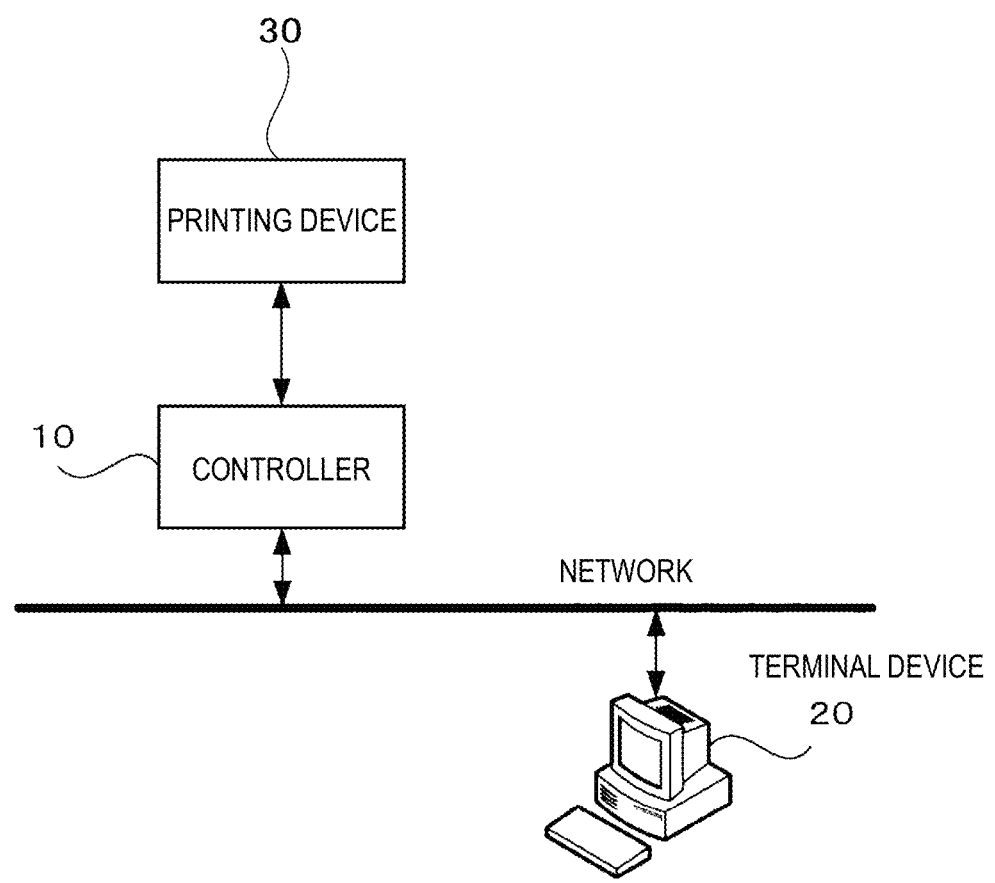
FIG. 1 is a diagram illustrating a system configuration of a printing system according to an exemplary embodiment of the present invention.

FIG. 1 is a diagram illustrating an instance of a configuration of a printing system according to an exemplary embodiment of the present invention. As illustrated in FIG. 1, this printing system includes a printing device 30 that performs printing on a continuous sheet, a controller (print control device) 10, and a terminal device 20.

The terminal device 20 generates a print instruction such as a print job and transmits the print instruction to the controller 10 via a network. The controller 10 functions as a print control device that controls a print operation of the printing device 30 according to the print instruction transmitted from the terminal device 20. The printing device 30 outputs an image corresponding to the print instruction on a continuous sheet based on the control of the controller 10.

Figure 2:
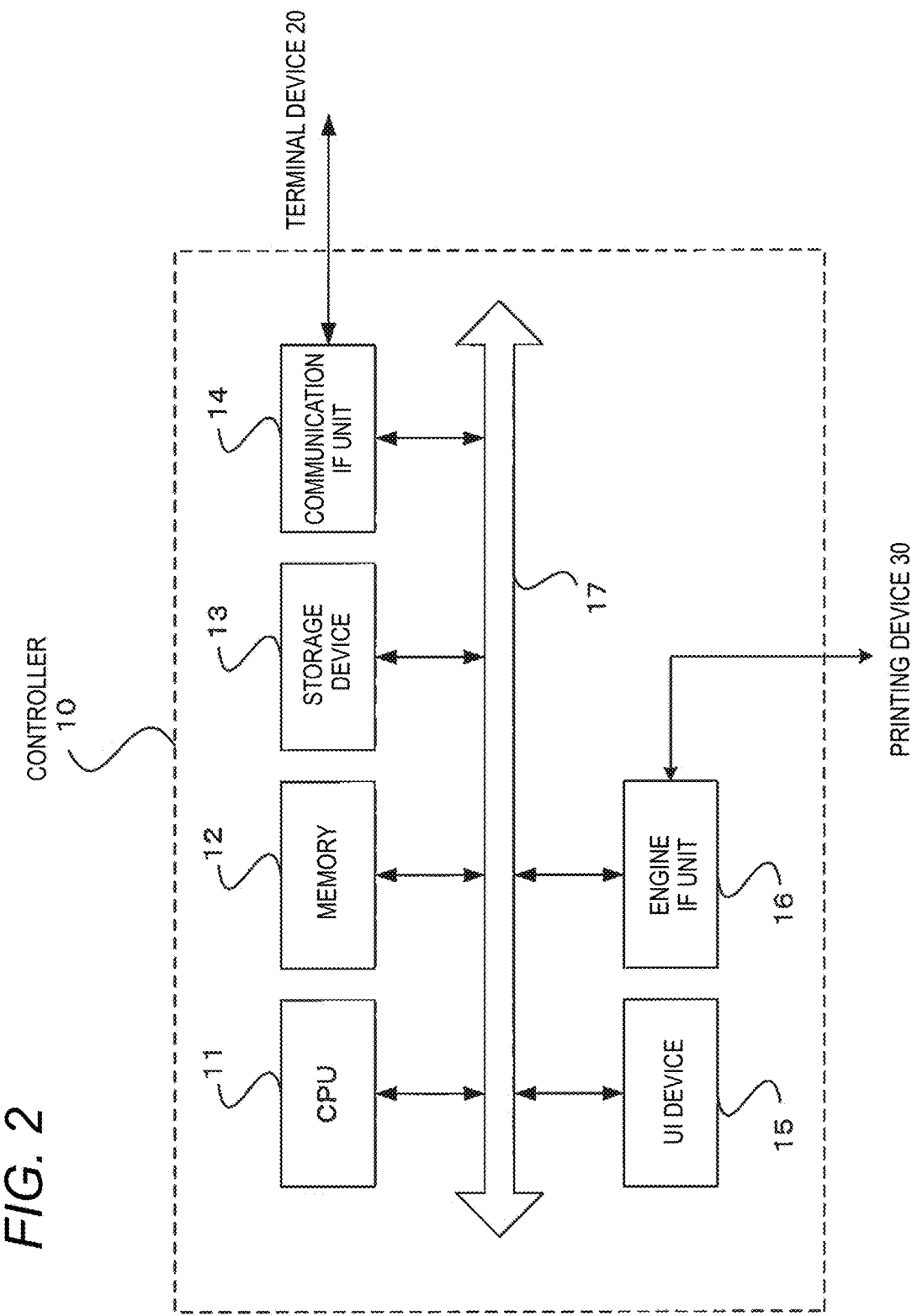
FIG. 2 is a block diagram illustrating a hardware configuration of a controller 10 according to the exemplary embodiment of the present invention.

Next, a hardware configuration of the controller 10 of the printing system according to the present exemplary embodiment will be described with reference to FIG. 2. As illustrated in FIG. 2, the controller 10 of the present exemplary embodiment includes a CPU 11, a memory 12, a storage device 13 such as a hard disk drive (HDD), a communication interface (IF) unit 14 that transmits and receives data to and from the terminal device 20 via a network, a user interface (UI) device 15 configured with a touch panel or a liquid crystal display, and an engine IF unit 16 that transmits and receives data to and from the printing device 30. These components are interconnected through a control bus 17.

The CPU 11 executes a predetermined process based on a print control program stored in the memory 12 or the storage device 13 and controls the operation of the controller 10. In the present exemplary embodiment, a description has been made that the CPU 11 reads and executes the control program stored in the memory 12 or the storage device 13, but it is possible to provide the program to the CPU 11 by being stored in a portable storage medium such as CD-ROM.

Figure 3:
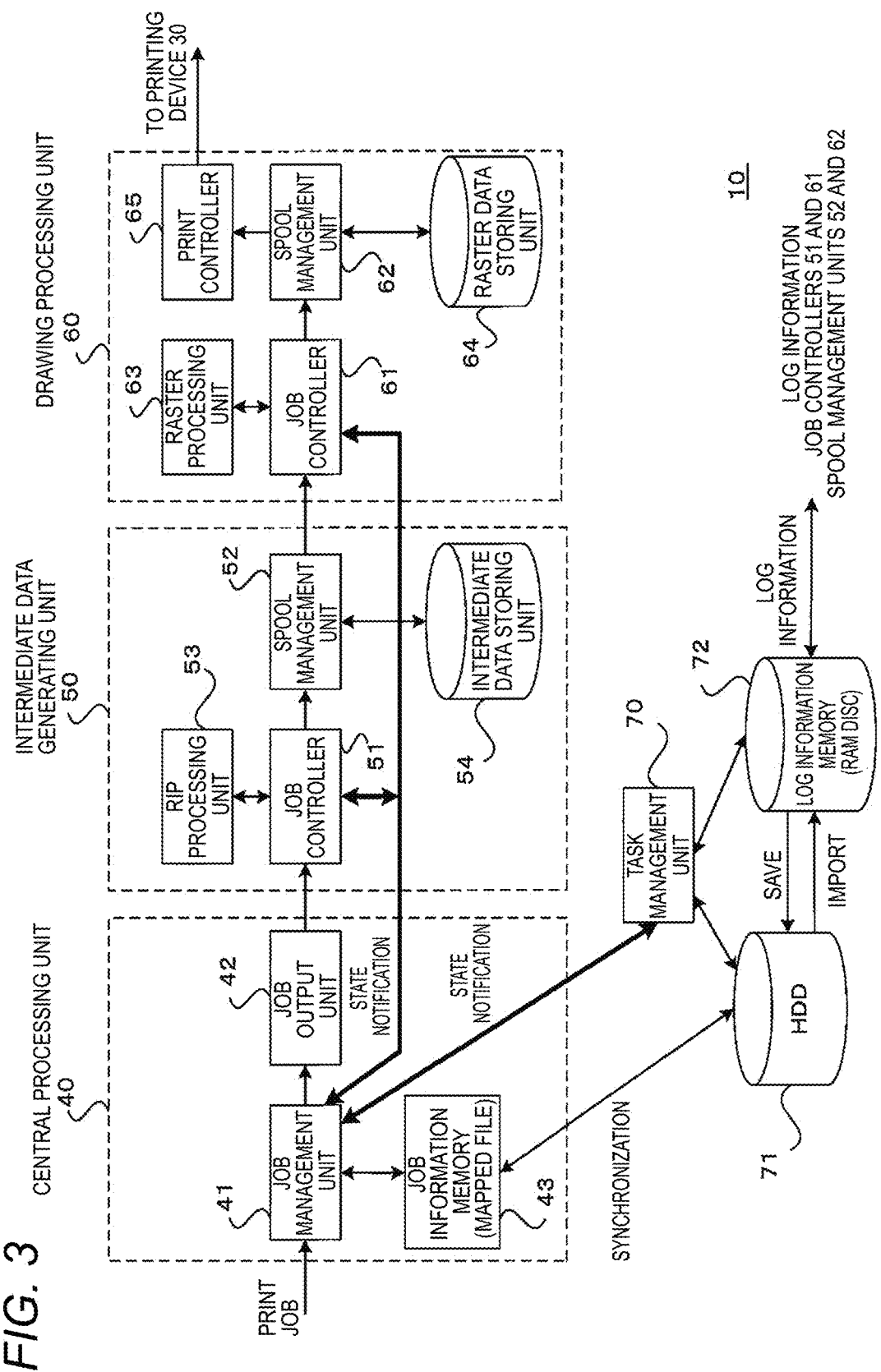
FIG. 3 is a block diagram illustrating a functional configuration of the controller 10 according to the exemplary embodiment of the present invention.

FIG. 3 is a block diagram illustrating a functional configuration of the controller 10 which is realized by the execution of the control program.

As illustrated in FIG. 3, the controller 10 of the present exemplary embodiment includes a central processing unit 40, an intermediate data generating unit 50, a drawing processing unit 60, a task management unit 70, an HDD 71 which is a nonvolatile memory, and a log information memory 72 such as a RAM disc.

Moreover, the central processing unit 40 includes a job management unit 41, a job output unit 42, and a job information memory 43.

Moreover, the intermediate data generating unit 50 includes a job controller 51, a spool management unit 52, a raster image processing (RIP) processing unit 53, and an intermediate data storing unit 54.

Moreover, the drawing processing unit 60 includes a job controller 61, a spool management unit 62, a raster processing unit 63, a raster data storing unit 64, and a print controller 65.

The task management unit 70 performs overall internal management of the system such as the activation and shutdown process of the entire system, control such as activation and shutdown of internal modules associated with this process, state management of the entire system, priority setting of respective modules, management of CPU cores, and adjustment during collection of log information.

At the time of the activation of the system, internal necessary modules are activated by the task management unit 70, and a series of functions of the printer controller including a print process are realized by cooperation of the activated modules.

For instance, a print job (print instruction) described in a page description language, transmitted from the terminal device 20 via a network is first registered in the job management unit 41 of the central processing unit 40. The job management unit 41 is a management unit that receives and manages the transmitted print job. The job management unit 41 manages the state of the registered print job and executes or removes the registered print job based on an instruction from a user interface (UI) or the like. Moreover, the job management unit 41 receives a notification of an execution state of the print job from the job controller 51 of the intermediate data generating unit 50 and the job controller 61 of the drawing processing unit 60 to update the execution state of the print job.

The job management unit 41 stores job information (attribute information) indicating the attribute of a print job, such as a job ID (identifier) of the print job, a file name, and various items of setting information such as the number of pages in the job information memory 43.

The job information memory 43 stores the job information in a file format called a mapped file (memory-mapped file). This mapped file is a storage method of mapping and storing file data directly onto a continuous area of a virtual storage space. According to this method, the job information stored in the HDD 71 in a file format is used as a resource and the information having the same content as the job information stored in the HDD 71 is stored in the job information memory 43.

However, when the job management unit 41 updates the job information in the job information memory 43, the job information in the HDD 71 has a different content from the job information in the job information memory 43 unless predetermined processing is performed.

Thus, the job management unit 41 executes a synchronization process for making the job information in the HDD 71 identical to the job information in the job information memory 43. When this synchronization process is executed, the job information in the HDD 71 has the same content as the job information in the job information memory 43.

The job output unit 42 transmits the print job to the intermediate data generating unit 50 in respective pages based on the control of the job management unit 41.

Here, the intermediate data generating unit 50 generates intermediate data (print data of an intermediate format) based on the print job received by the central processing unit 40. Moreover, the drawing processing unit 60 converts the intermediate data generated by the intermediate data generating unit 50 to raster data (image data of a raster format). The print controller 65 controls the printing device 30 based on the image data converted by the drawing processing unit 60.

The image data of the raster format is an instance of image data for drawing and image data of another format may be used as the image data for drawing.

The intermediate data generating unit 50 transmits the print job transmitted in respective pages from the central processing unit 40 to the RIP processing unit 53 so that the print job is subjected to a RIP process to thereby generate intermediate data (print data of an intermediate format).

The spool management unit 52 stores the intermediate data generated by the RIP processing unit 53 in the intermediate data storing unit 54 as spool data and manages the intermediate data.

When the intermediate data is transmitted from the intermediate data generating unit 50 to the drawing processing unit 60, the job controller 61 of the drawing processing unit 60 executes a raster process on the transmitted intermediate data with the aid of the raster processing unit 63 to convert the intermediate data to image data of a raster format.

The spool management unit 62 of the drawing processing unit 60 stores the image data of the raster format converted by the raster processing unit 63 in the raster data storing unit 64 as spool data and manages the image data.

Upon receiving an instruction to execute a print process from the job management unit 41, the drawing processing unit 60 allows the print controller 65 to transmit the image data of the raster format to the printing device 30 in respective pages so that a print process is executed based on the image data.

In FIG. 3, although the print controller 65 is provided in the drawing processing unit 60, the print controller 65 may be configured to be independent from the drawing processing unit 60.

Here, the job controller 51 notifies the job management unit 41 of a state whether a RIP process is being executed by the intermediate data generating unit 50. Moreover, the job controller 61 notifies the job management unit 41 of a state whether a raster process is being executed by the drawing processing unit 60.

The job management unit 41 sends the state notification received from the job controllers 51 and 61 to the task management unit 70 so that the task management unit 70 can understand the state of the entire system. Specifically, based on the state notification from the job management unit 41, the task management unit 70 can understand whether the RIP process is being executed by the RIP processing unit 53 of the intermediate data generating unit 50 and whether the raster process is being executed by the raster processing unit 63 of the drawing processing unit 60.

Moreover, the log information memory 72 mainly stores log information (history information) indicating the print stop state of a print job when various processes are executed by the job controllers 51 and 61 and the spool management units 52 and 62. The log information memory 72 also stores operation logs of the other modules.

Here, the log information memory 72 is configured as a so-called RAM disc that realizes the same storage device as a disk drive such as a HDD using a volatile memory. The details of the log information will be described below.

In a printing system that executes a print process based on a print job, various items of information necessary for processing the print job are preferably stored in a volatile memory and processing is preferably executed in order to realize high-speed processing.

When the system shuts down normally, since various items of information stored in the volatile memory are stored in a nonvolatile storage unit, such as a HDD, the system can restore to the original state normally even when the system restarts.

However, when an unexpected power interruption occurs, since the information in the volatile memory will be lost, even when the system is turned on again and is activated again, the system is preferably able to restore to the original state.

Next, the operation of the controller 10 of the present exemplary embodiment will be described with reference to the flowchart of FIG. 4.

When the job output unit 42 of the central processing unit 40 transmits a print job to the intermediate data generating unit 50 in respective pages (step S101) and the job management unit 41 issues an instruction to execute a RIP process to the job controller 51 (step S102), the RIP processing unit 53 in the intermediate data generating unit 50 executes a RIP process to generate intermediate data (step S103).

The generated intermediate data is stored in the intermediate data storing unit 54 as spool data, and the spool management unit 52 manages the stored intermediate data (step S104).

When the intermediate data is transmitted from the intermediate data generating unit 50 to the drawing processing unit 60 (step S105) and an output instruction is transmitted from the job management unit 41 to the job controller 61 (step S106), the job controller 61 notifies the job management unit 41 of the start of a print process and the job management unit 41 notifies the task management unit 70 of the start of printing (step S107).

In the drawing processing unit 60, the raster processing unit 63 executes a raster process on the intermediate data (step S108) and the raster data is stored in the raster data storing unit 64 and is managed by the spool management unit 62 (step S109).

The print controller 65 transmits the spooled raster data to the printing device 30 and executes a print process (step S110).

The print controller 65 executes the print process until there is no raster data of a page to be printed and ends the print process when there is no page data to be printed (step S111). The job controller 61 notifies the job management unit 41 of the end of the print process and the job management unit 41 notifies the task management unit 70 of the end of the print process.

A period until the job management unit 41 notifies the task management unit 70 of the end of the print process after the job management unit 41 notifies the task management unit 70 of the start of printing is a period in which it is determined that the task management unit 70 is under execution of the print process.

[Outline of Data Storage Process]

In the controller 10 of the present exemplary embodiment, in order to realize high-speed processing, job information indicating the attribute of a print job and log information necessary for the control of the intermediate data generating unit 50 and the drawing processing unit 60 are stored in the job information memory 43 and the log information memory 72 and are used.

However, when the job information memory 43 and the log information memory 72 are configured with volatile memories and power is interrupted, the contents stored therein may be deleted.

Thus, even when the system is reactivated after it is shut down, in order to restore to the original state before the shutdown, the job management unit 41 and the task management unit 70 execute a process of storing these items of information in the HDD 71 which is a nonvolatile storage unit before the shutdown.

Specifically, in the controller 10 of the present exemplary embodiment, when the system is shut down, the job management unit 41 performs a synchronization process of synchronizing the job information stored in the job information memory 43 with the job information stored in the HDD 71. Moreover, the task management unit 70 performs a process of saving the log information stored in the log information memory 72 in the HDD 71.

However, in order to restore to the original state even when an unexpected power interruption occurs as well as a power interruption based on a normal operation, the job management unit 41 and the task management unit 70 execute synchronization of the job information in the job information memory 43 and saving of the log information in the log information memory 72 in cases other than the normal power interruption.

The job information synchronization process and the log information saving process will be collectively referred to as a data storage process. Hereinafter, this data storage process will be described.

First, a list of items of information stored (synchronized and saved) in the HDD 71 will be described with reference to FIG. 5.

Figure 5:
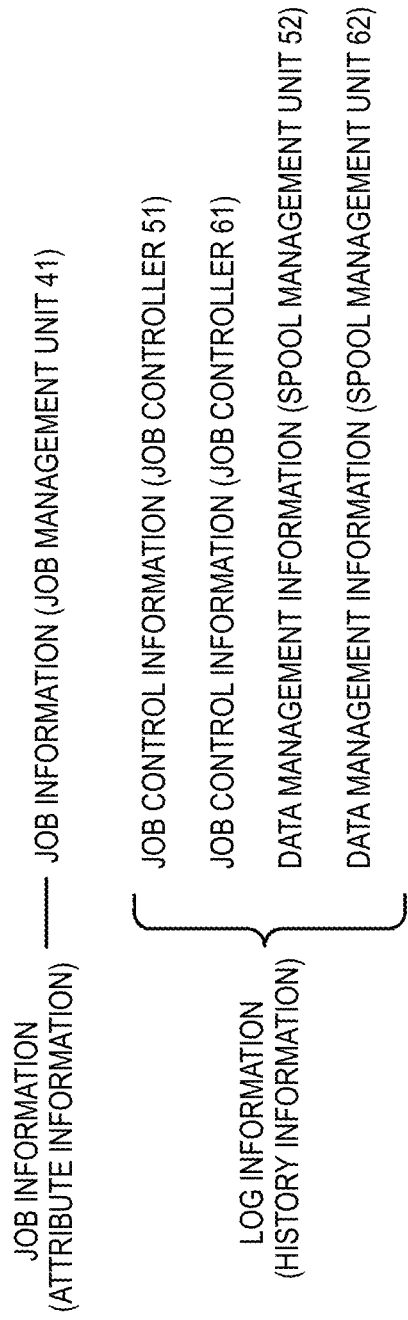
FIG. 5 is a diagram illustrating a list of items of information stored (synchronized and saved) in a HDD 71.

As can be understood from FIG. 5, when a data storage process is executed, the job management unit 41 stores the job information stored in the job information memory 43 in the HDD 71 and the task management unit 70 stores the log information (history information) used in the intermediate data generating unit 50 and the drawing processing unit 60 in the HDD 71.

Here, the log information includes job control information which is used in the job controller 51 of the intermediate data generating unit 50 and indicates the processing state of a print job being processed, job control information which is used in the job controller 61 of the drawing processing unit 60 and indicates the processing state of a print job being processed, data management information for managing the intermediate data stored in the intermediate data storing unit 54 of the spool management unit 52, and data management information for managing the raster data stored in the raster data storing unit 64 of the spool management unit 62.

Specifically, the job control information is information indicating the processing state of a print job being processed such as information indicating to which page processing has been executed. Moreover, the data management information is information indicating a storage location or the like in which the intermediate data storing unit 54 and the raster data storing unit 64 store the intermediate data and the raster data.

[Details of Data Storage Process]

First, before the detailed description is given about the data storage process of the controller 10 according to the present exemplary embodiment, a state transition of the controller 10 will be described with reference to the diagram (state transition diagram) illustrated in FIG. 6.

The controller 10 performs transition between four states including a power-off state, an idle state (standby state), a printing state, and a print stop state as a basic operation state.

The job management unit 41 and the task management unit 70 of the present exemplary embodiment store the job information stored in the job information memory 43 and the log information stored by the job controller 51 of the intermediate data generating unit 50 and the job controller 61 of the drawing processing unit 60 in the HDD 71 using the resources of the intermediate data generating unit 50 and the drawing processing unit 60 in a state other than the print stop state, which is a state in which a print process based on a print job is not executed. In the case of the power-off state, since the controller 10 is not operable, the process of storing the job information and the log information is not executed.

Figure 4:
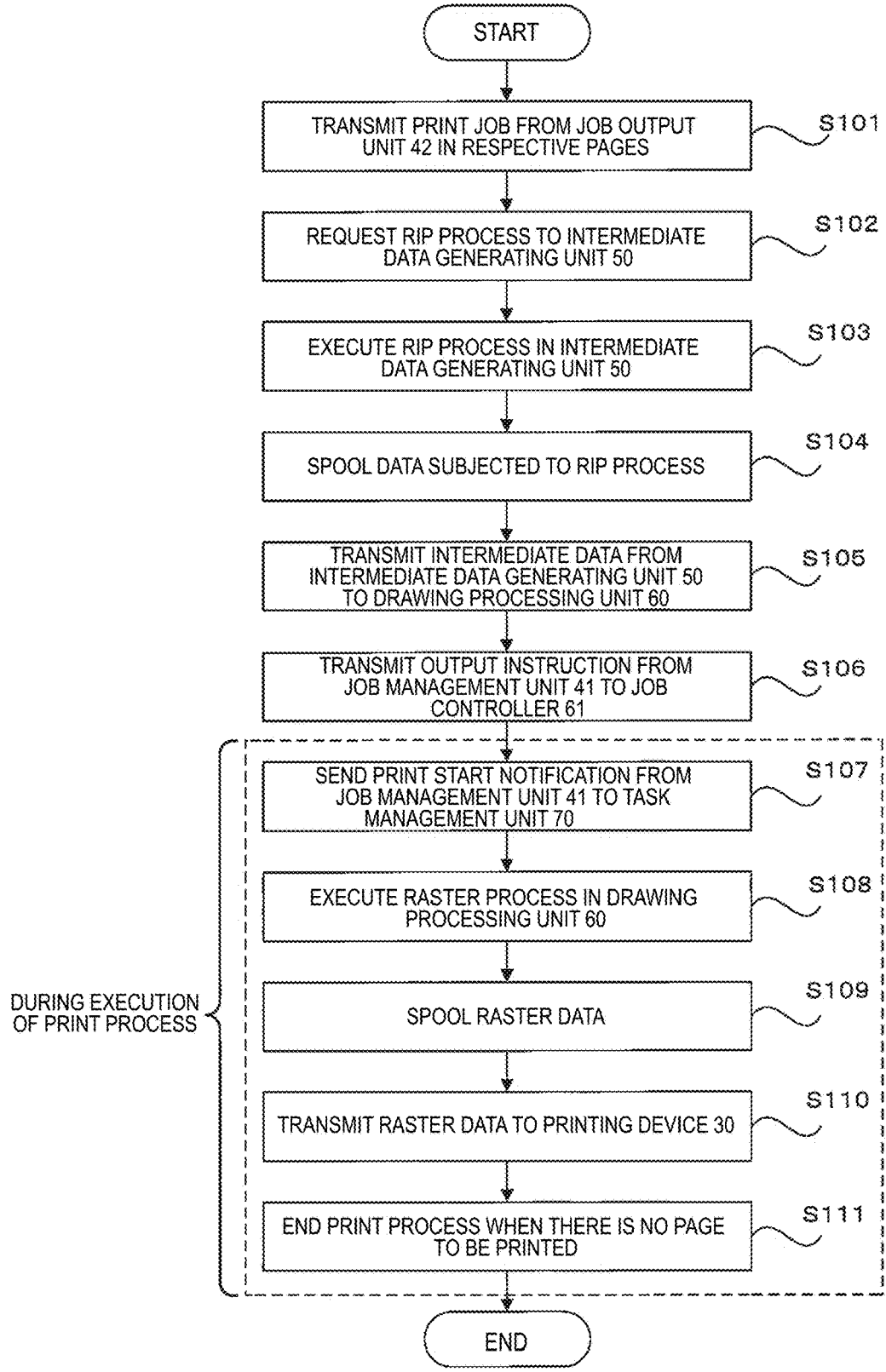
FIG. 4 is a flowchart illustrating an operation of the controller 10 according to the exemplary embodiment of the present invention.

Here, a case in which the print process based on a print job is not executed is a case other than a print process execution state indicated in the flowchart of FIG. 4 and is a case in which the raster processing unit 63 of the drawing processing unit 60 is not performing a process of converting image data to raster data and the print controller 65 is not performing print control on the printing device 30.

Moreover, the resources of the intermediate data generating unit 50 and the drawing processing unit 60 used when the job management unit 41 and the task management unit 70 store the job information and the log information in the HDD 71 means various resources for executing processes, specifically such as the processing performance of the CPU and the memory capacity of RAM. For instance, when the controller 10 is controlled by one CPU, the processing performance of the CPU is consumed by various modules including the central processing unit 40, the intermediate data generating unit 50, and the drawing processing unit 60. Thus, in order to store the job information and the log information in the HDD 71 in a state other than the printing state, the job management unit 41 and the task management unit 70 execute the process of storing the job information and the log information using the resources used when the intermediate data generating unit 50 and the drawing processing unit 60 execute processes since the intermediate data generating unit 50 and the drawing processing unit 60 are not executing processes.

A basic state transition of the controller 10 will be described with reference to the diagram illustrated in FIG. 6. The state of the controller 10 transitions from a power-off state to an idle state in response to a power-on event in which power is supplied. Moreover, when a power-off operation is performed in the idle state, the controller 10 enters into the power-off state. When a print job is received in the idle state and a print instruction is received, printing starts and the controller 10 enters into a printing state. When printing of all pages of the print job is completed, the controller 10 enters into the print stop state.

When a state in which a print process based on a subsequent print job is not started is continued for a preset interval period after a print stop state in which a print process based on a certain print job ends, the job management unit 41 and the task management unit 70 store the job information stored in the job information memory 43 and the log information stored by the job controller 51 of the intermediate data generating unit 50 and the job controller 61 of the drawing processing unit 60 in the HDD 71.

For instance, when the interval period is two hours and the print stop state is continued for two hours, the job management unit 41 performs a process of synchronizing the job information stored in the job information memory 43 and the task management unit 70 saves the log information stored by the job controller 51 of the intermediate data generating unit 50 and the job controller 61 of the drawing processing unit 60 in the HDD 71.

After the data storage process ends, the controller 10 enters to the idle state.

When an idle state in which a print process based on a print job is not started is continued for a preset interval period, the job management unit 41 and the task management unit 70 stores the job information stored in the job information memory 43 and the log information stored by the job controller 51 of the intermediate data generating unit 50 and the job controller 61 of the drawing processing unit 60 in the HDD 71.

For instance, when the interval period is one hour and the idle state in which a subsequent print process is not started is continued for one hour, the job management unit 41 performs a process of synchronizing the job information stored in the job information memory 43 and the task management unit 70 saves the log information stored by the job controller 51 of the intermediate data generating unit 50 and the job controller 61 of the drawing processing unit 60 in the HDD 71.

When the print process is not started and the idle state is continued, the job management unit 41 and the task management unit 70 repeat the process of storing the job information and the log information every one hour.

Figure 7:
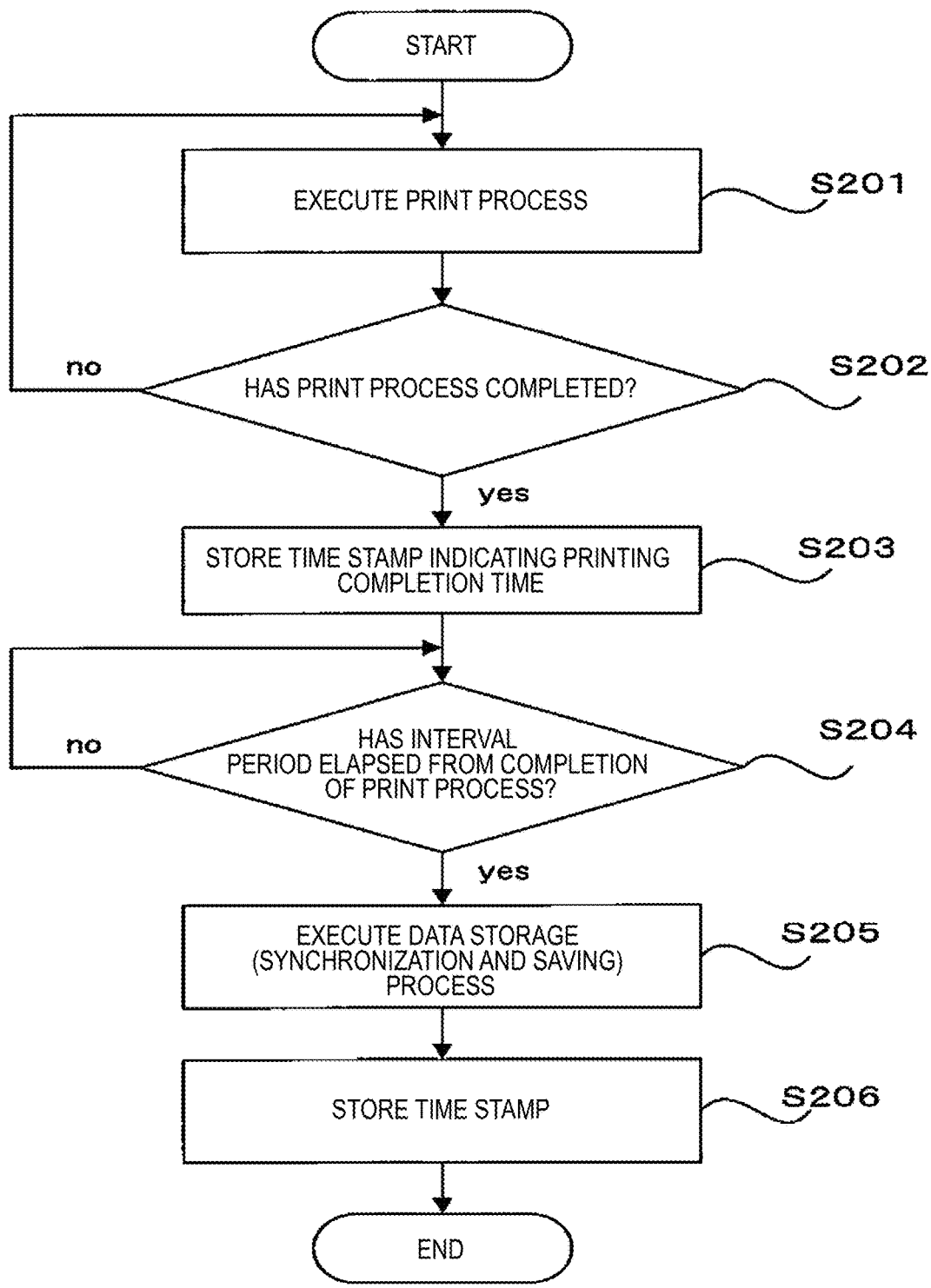
FIG. 7 is a flowchart illustrating an operation performed during a data storage process in a print stop state.

Next, the operation when a data storage process is performed in the print stop state will be described with reference to the flowchart of FIG. 7.

When raster data is generated in the drawing processing unit 60 and the raster data generated by the print controller 65 is transmitted to the printing device 30 whereby a print process is executed (step S201) and the print process is completed (step S202), the job management unit 41 and the task management unit 70 store a time stamp (time information) indicating the printing completion time (step S203).

Moreover, the job management unit 41 and the task management unit 70 measure the time elapsed from the completion of printing from a difference between a stored time stamp and a present time stamp (step S204). In step S204, when the time elapsed from the completion of printing exceeds a preset interval period, the job management unit 41 and the task management unit 70 execute the process of storing the job information and the log information (step S205).

Moreover, the job management unit 41 and the task management unit 70 store a new time stamp indicating the time when the data storage process is executed (step S206).

Figure 8:
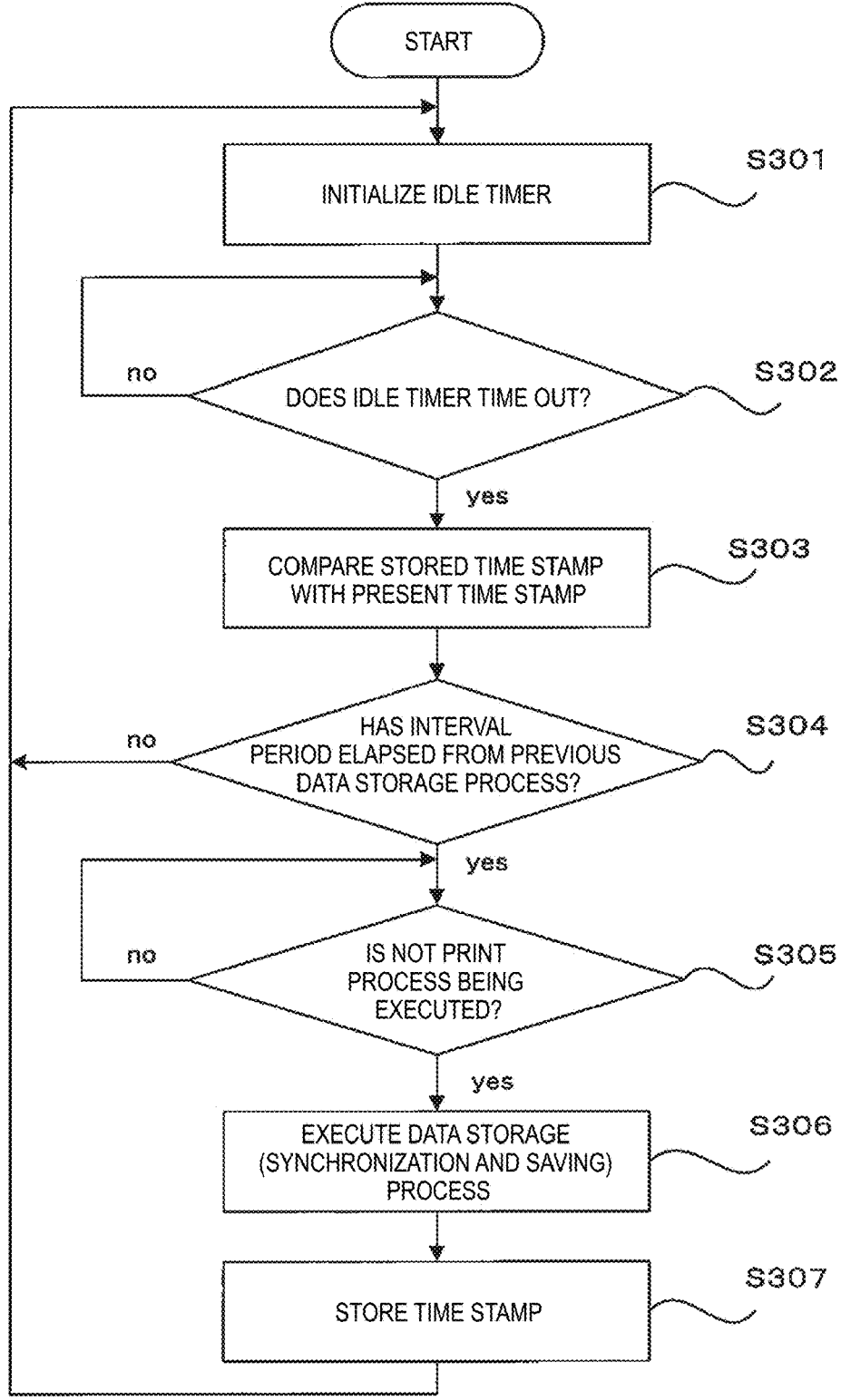
FIG. 8 is a flowchart illustrating an operation during a data storage process in an idle state.

Next, the operation when a data storage process is performed in the idle state will be described with reference to the flowchart of FIG. 8.

The job management unit 41 and the task management unit 70 measure the time for executing various processes using an idle timer that times-out every predetermined period in the idle state. When an idle state occurs, the job management unit 41 and the task management unit 70 initialize the idle timer (step S301).

When the idle timer times out (step S302), the job management unit 41 and the task management unit 70 compare a stored time stamp with a present time stamp to measure the time elapsed from the previous data storage process (step S303). When the time elapsed from the previous data storage process does not exceed a preset interval period (step S304: no), the job management unit 41 and the task management unit 70 initialize the idle time again and repeat processes (step S301).

When the time elapsed from the previous data storage process exceeds the preset interval period (step S304: yes), the job management unit 41 and the task management unit 70 check whether a print process is being executed (step S305) and execute the process of storing the job information and the log information (step S306).

The job management unit 41 and the task management unit 70 store a new time stamp indicating the time when the data storage process is executed and returns to the process of step S301 (step S307).

For instance, when the idle timer is set to time out every one minute and the interval period of the data storage process in the idle state is one hour, the job management unit 41 and the task management unit 70 execute the process of storing the job information and the log information whenever the idle timer times out 60 times.

Figure 6:
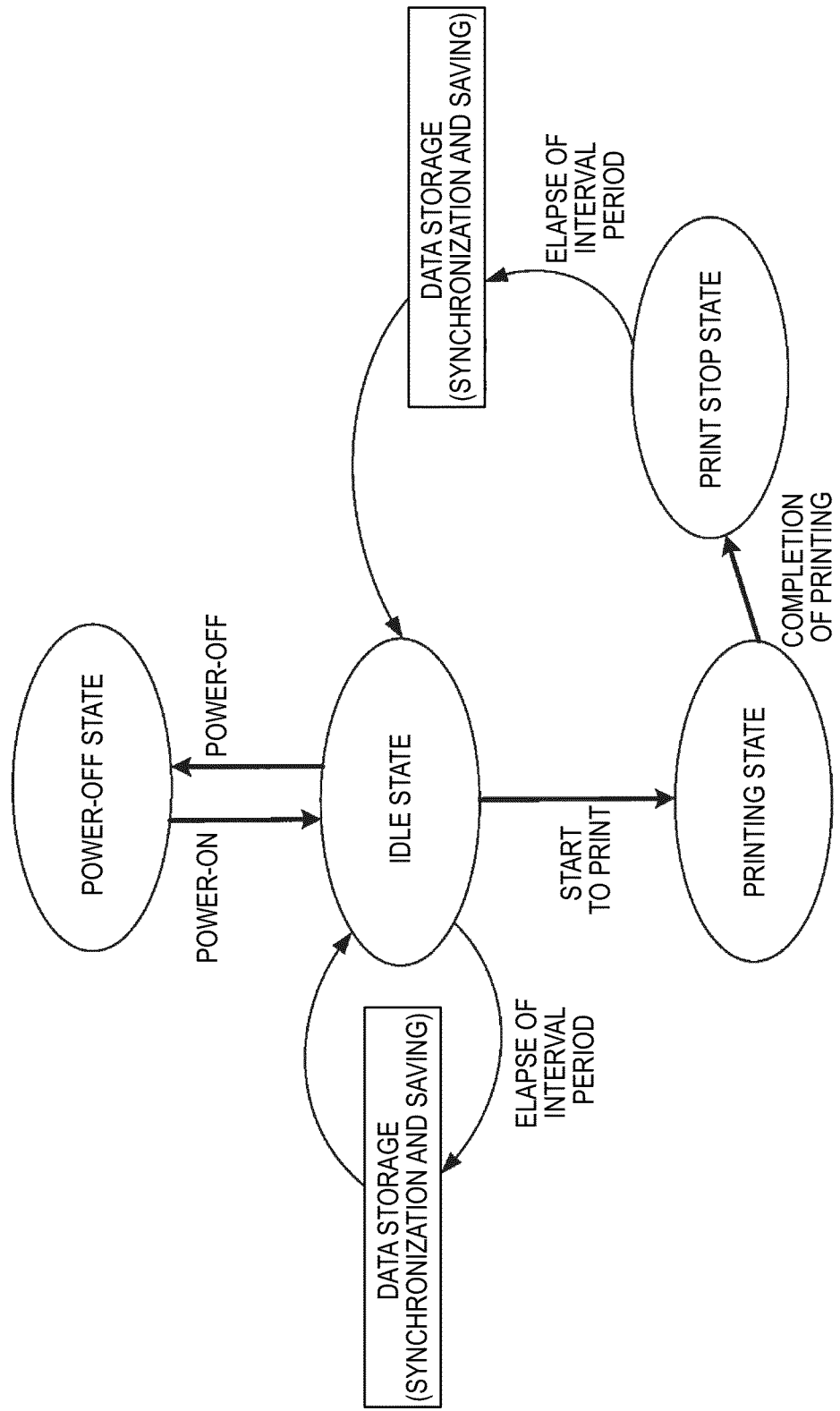
FIG. 6 is a diagram (state transition diagram) illustrating a state transition of the controller 10 according to the exemplary embodiment of the present invention.

In the diagram illustrated in FIG. 6, although the idle state includes a state (RIP processing state) in which the intermediate data generating unit 50 performs a process of generating intermediate data based on a print job and spooling the intermediate data only and the drawing processing unit 60 does not perform a print process, the RIP processing state may be an independent state which is not included in the idle state.

Figure 9:
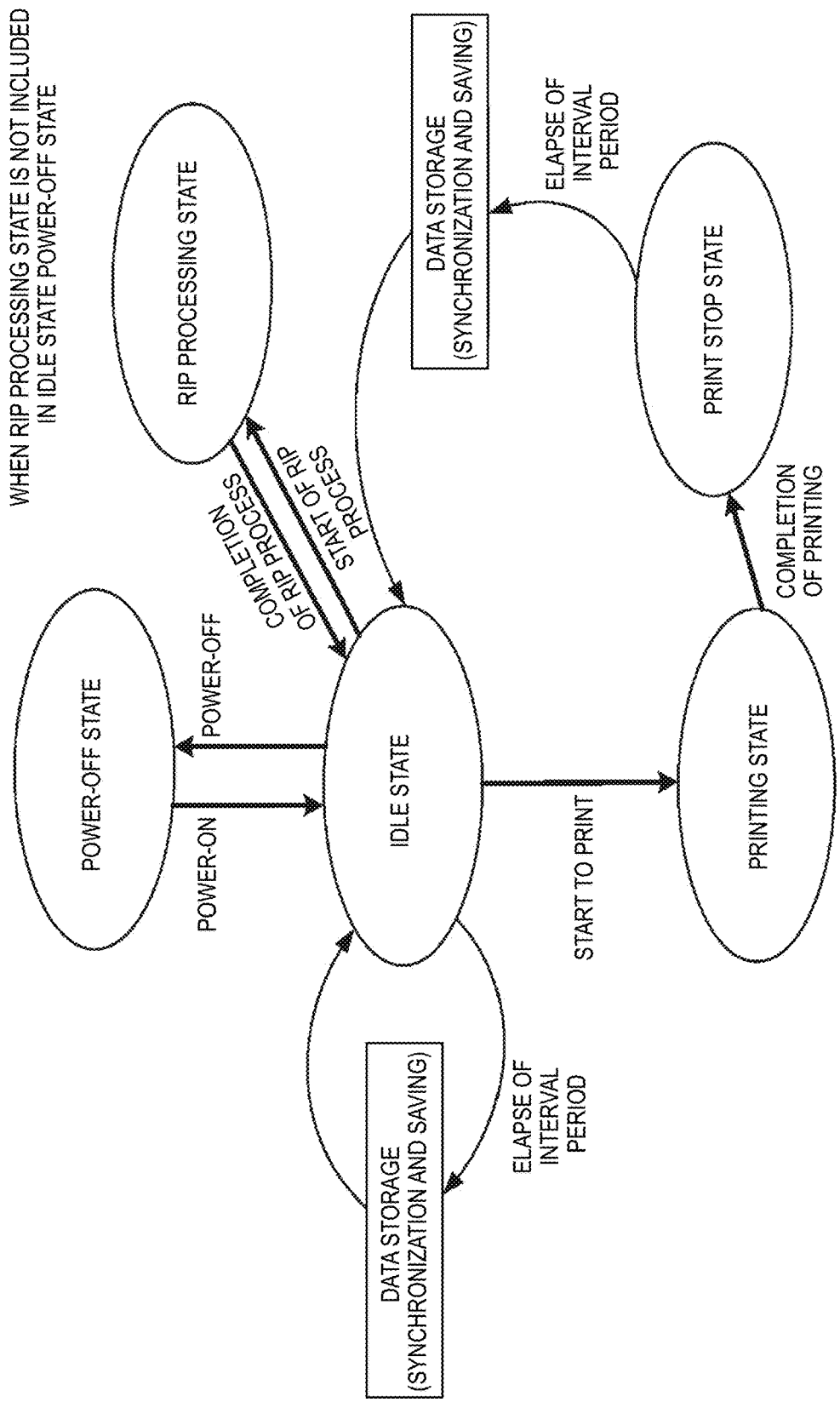
FIG. 9 is a diagram (state transition diagram) when a RIP processing state is not included in an idle state.

Specifically, as in the diagram illustrated in FIG. 9, a state in which the intermediate data generating unit 50 performs a process of generating intermediate data based on a print job and spooling the intermediate data may be regarded as a RIP processing state. In this case, the controller enters into the RIP processing state when a RIP process starts in the idle state and enters into the idle state when the RIP process is completed.

In such a case, the job management unit 41 and the task management unit 70 may store the job information stored in the job information memory 43 and the log information stored by the job controller 51 of the intermediate data generating unit 50 and the job controller 61 of the drawing processing unit 60 in the HDD 71 when a print process based on a print job is not executed and the intermediate data generating unit 50 is not generating intermediate data.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control device comprising:
   a central processing unit (CPU) configured to act as:
      a management unit that receives and manages a print instruction;
      a generation unit that generates a print data of an intermediate format based on the print instruction that is received;
      a conversion unit that converts the print data of an intermediate format generated by the generation unit to an output image data;
      a print controller that controls a printing device based on the output image data converted by the conversion unit; and
      a storage unit that stores an attribute information indicating an attribution of the print instruction stored by the management unit and history information indicating a processing state of the print instruction stored by the generation unit and the conversion unit in a nonvolatile storing unit when a first preset interval period has elapsed from an end of a print process based on the print instruction without receiving another print instruction by the management unit and that repeats storing the attribute information and the history information in the nonvolatile storing unit every first preset interval periods in a standby state in which power is supplied.

2. The print control device according to claim 1, wherein the print process based on the print instruction includes a converting process to convert the print data of the intermediate format to the output image data performed by the conversion unit and a print control process on the printing device performed by the print controller.

3. The print control device according to claim 1, wherein the history information includes a first control information indicating a processing state of a print instruction in the generation unit, a second control information indicating a processing state of the print instruction in the conversion unit, a first management information to manage the print data of the intermediate format that is generated, and a second management information to manage the output image data that is converted.

4. A print control device comprising:
   a central processing unit (CPU) configured to act as:
      a management unit that receives and manages a print instruction;
      a generation unit that generates a print data of an intermediate format based on the print instruction that is received;
      a conversion unit that converts the print data of an intermediate format generated by the generation unit to an output image data;
      a print controller that controls a printing device based on the output image data converted by the conversion unit; and
      a storage unit that stores an attribute information indicating an attribution of the print instruction stored by the management unit and history information indicating a processing state of the print instruction stored by the generation unit and the conversion unit in a nonvolatile storing unit when a preset interval period has elapsed from an end of a print process based on the print instruction without receiving another print instruction by the management unit and without generating the print data of the intermediate format by the generation unit and that repeats storing the attribute information and the history information in the nonvolatile storing unit every first preset interval periods in a standby state in which power is supplied.

5. The print control device according to claim 4, wherein the print process based on the print instruction includes a converting process to convert the print data of the intermediate format to the output image data performed by the conversion unit and a print control process on the printing device performed by the print controller.

6. The print control device according to claim 5, wherein the history information includes a first control information indicating a processing state of a print instruction in the generation unit, a second control information indicating a processing state of the print instruction in the conversion unit, a first management information to manage the print data of the intermediate format that is generated, and a second management information to manage the output image data that is converted.

7. The print control device according to claim 4, wherein the history information includes a first control information indicating a processing state of a print instruction in the generation unit, a second control information indicating a processing state of the print instruction in the conversion unit, a first management information to manage the print data of the intermediate format that is generated, and a second management information to manage the output image data that is converted.

8. A non-transitory computer readable medium storing a program causing a computer to execute a process for controlling a print data, the process comprising:
   receiving and managing a print instruction;

generating the print data of an intermediate format based on the print instruction that is received;

converting the print data of the intermediate format to an output image data;

controlling a printing device based on the image data; and storing an attribute information indicating an attribution of the print instruction and history information indicating a processing state of the print instruction in a nonvolatile storing unit when a preset interval period has elapsed from an end of a print process based on the print instruction without receiving another print instruction; and repeating storing the attribute information and the history information in the nonvolatile storing unit every first preset interval periods in a standby state in which power is supplied.

* * * * *